(12) United States Patent
Drane

(10) Patent No.: US 6,817,504 B2
(45) Date of Patent: Nov. 16, 2004

(54) COLLAPSIBLE TRUNK ORGANIZER

(76) Inventor: Colin Drane, 2639 Boston St., Apt. 309, Baltimore, MD (US) 21224

( * ) Notice: Subject to any disclaimer, the term of this patent is extended or adjusted under 35 U.S.C. 154(b) by 0 days.

(21) Appl. No.: 10/776,549

(22) Filed: Feb. 11, 2004

(65) Prior Publication Data

US 2004/0140334 A1 Jul. 22, 2004

(51) Int. Cl.$^7$ ................................................. B60R 7/00
(52) U.S. Cl. ............................. 224/542; 224/925; 220/6
(58) Field of Search .......................... 224/42.34, 42.32, 224/539, 542, 901.8, 925; 220/6, 4.28, 529, 531; 229/120.25, 120.34

(56) References Cited

U.S. PATENT DOCUMENTS

| | | | | |
|---|---|---|---|---|
| 3,749,299 A | * | 7/1973 | Ingle | 229/120.34 |
| 3,986,656 A | | 10/1976 | November | 229/15 |
| 4,029,244 A | | 6/1977 | Roberts | 224/42 |
| 4,136,815 A | * | 1/1979 | Gardner | 229/120.25 |
| 4,189,056 A | | 2/1980 | Majewski | 211/195 |
| 4,226,348 A | | 10/1980 | Dottor et al. | 224/42 |
| 5,004,146 A | | 4/1991 | Thominet et al. | 229/120 |
| 5,054,668 A | | 10/1991 | Ricchiuti | 224/42 |
| 5,167,363 A | | 12/1992 | Adkinson et al. | 229/120 |
| 5,366,189 A | | 11/1994 | Thonpson | 248/97 |
| 5,419,471 A | | 5/1995 | Polumbaum et al. | 224/42 |
| 5,518,170 A | | 5/1996 | Rasmussen | 229/120 |
| 5,538,148 A | | 7/1996 | Indyk | 211/195 |
| 5,713,502 A | * | 2/1998 | Dixon | 224/542 |
| 5,772,058 A | | 6/1998 | Staesche | 220/6 |
| 5,819,996 A | | 10/1998 | Koons | 224/42 |
| 6,015,071 A | | 1/2000 | Adomelt et al. | 224/42 |
| 6,056,177 A | * | 5/2000 | Schneider | 224/542 |
| 6,206,224 B1 | | 3/2001 | Potts et al. | 220/495 |
| 6,253,943 B1 | * | 7/2001 | Spykerman et al. | 220/6 |
| 6,488,168 B1 | | 12/2002 | Wang | 220/7 |

* cited by examiner

Primary Examiner—Nathan J. Newhouse
(74) Attorney, Agent, or Firm—Larry J. Guffey

(57) ABSTRACT

A portable, collapsible trunk or cargo space organizer has: (a) an initially flat, rectangular main panel having a centerline between its ends, with a parallel fold line at a specified distance on each side of the centerline; these fold lines serving to define two movable, side sections and a middle section of this main panel, (b) a flat, rectangular middle panel whose top side corner edges have a specified radius of curvature, (c) flat, rectangular end panels whose width is approximately equal to the width of the main panel's middle section, and with the bottom edge of such end panels having a notch that is configured to cooperate with the middle panel's curved corner edges, (d) a strap of length approximately equal to the main panel's middle section, with each of the strap's ends attaching to one of the main panel's side edges and with its midpoint attaching to a point on the top edge of the middle panel, (e) means for coupling each of the top side corners of the end panels to one of the corners of the main panel's side edges, and (f) a means for hingedly coupling the middle panel's bottom edge proximate the centerline of the main panel.

14 Claims, 3 Drawing Sheets

COLLAPSIBLE TRUNK ORGANIZER

BACKGROUND OF THE INVENTION

1. Field of the Invention

The present invention generally relates to receptacles and package and article carriers. More particularly, this invention relates to a collapsible trunk organizer.

2. Description of the Related Art

Automobile trunks and mini vans and other vehicles with relatively flat cargo storage areas provide little means for confining packages placed within such spaces. Thus, there exists a need for a system that provides, when needed, individual storage areas for segregating and supporting items such as grocery bags and the like and yet, when not needed, can be folded flat, so as to occupy minimal space so that the storage device need not be removed from the vehicle. Many relatively complicated, interlocking storage devices have been proposed for this purpose. These include those devices disclosed in U.S. Pat. Nos. 3,986,656; 4,029,244; 4,189,056; 4,226,348; 5,004,146; 5,054,668; 5,167,363; 5,366,189; 5,419,471; 5,518,170; 5,538,148; 5,772,058; 5,819,996; 6,015,071; 6,206,224 and 6,488,168.

Although these storage devices serve to provide segregation and support for individual items, they tend to be somewhat complicated, expensive and few of them are easily converted between stored and use positions. Consequently, a need continues to exist for an inexpensive, durable, easy-to-use and compact storage system for organizing vehicle storage area for the convenience of the user as well as facilitating the support of items being transported.

3. Objects and Advantages

There has been summarized above, rather broadly, the prior art that is related to the present invention in order that the context of the present invention may be better understood and appreciated. In this regard, it is instructive to also consider the objects and advantages of the present invention.

An object of the present invention is to provide a grocery shopping convenience device for use and stowing within an automobile trunk or other vehicle cargo space, and which overcomes the shortcomings of the prior art.

Specifically, it is an object to provide a portable collapsible organizer that, when open for operative use, accommodates bags of groceries within properly sized, rectangular shaped individual open cells for holding such bags in an upright position against movement during transit; and which, after use, can be quickly closed in a relatively flat configuration by collapsing it, without the need for any tools, added parts or hardware, for convenient stowing.

It is another object of the present invention that this organizer use similar procedures for opening and closing the organizer.

It is a further object of the present invention that this organizer be durable and capable of being opened or closed numerous times.

It is an object of the present invention that this organizer be economical to produce.

Other objects and advantages of the present invention will become readily apparent as the invention is better understood by reference to the accompanying drawings and the detailed description that follows.

SUMMARY OF THE INVENTION

The present invention is generally directed to satisfying the needs set forth above and overcoming the limitations and problems identified with prior interlocking storage devices.

In accordance with one preferred embodiment, the present invention takes the form of a portable, collapsible trunk or cargo space organizer. Its elements include: (a) an initially flat, rectangular main panel having a centerline between its ends, with a parallel fold line at a specified distance on each side of the centerline; these fold lines serving to define two movable, side sections and a middle section of this main panel, (b) a flat, rectangular middle panel whose top side corner edges have a specified radius of curvature, (c) flat, rectangular end panels whose width is approximately equal to the width of the main panel's middle section, and with the bottom edge of such end panels having a notch that is configured to cooperate with the middle panel's curved corner edges, (d) a strap of length approximately equal to the main panel's middle section, with each of the strap's ends attaching to one of the main panel's side edges and with its midpoint attaching to a point on the top edge of the middle panel, (e) means for coupling each of the top side corners of the end panels to one of the corners of the main panel's side edges, and (f) a means for hingedly coupling the middle panel's bottom edge proximate the centerline of the main panel.

In its stored mode, the ends of the organizer fold upward to allow the main panel's side sections and the middle panel to fold down so that the organizer can lay essentially flat. When in use, the main panel's side sections and the middle panel fold upward and are held in place by the end panels folding down so that their notches slide along the sides of middle panel so as to allow the end panels to stand upright to hold the various elements in place.

Thus, there has been summarized above, rather broadly, the present invention in order that the detailed description that follows may be better understood and appreciated. There are, of course, additional features of the invention that will be described hereinafter and which will form the subject matter of any eventual claims to this invention.

DESCRIPTION OF THE PREFERRED EMBODIMENT

Figure 1:
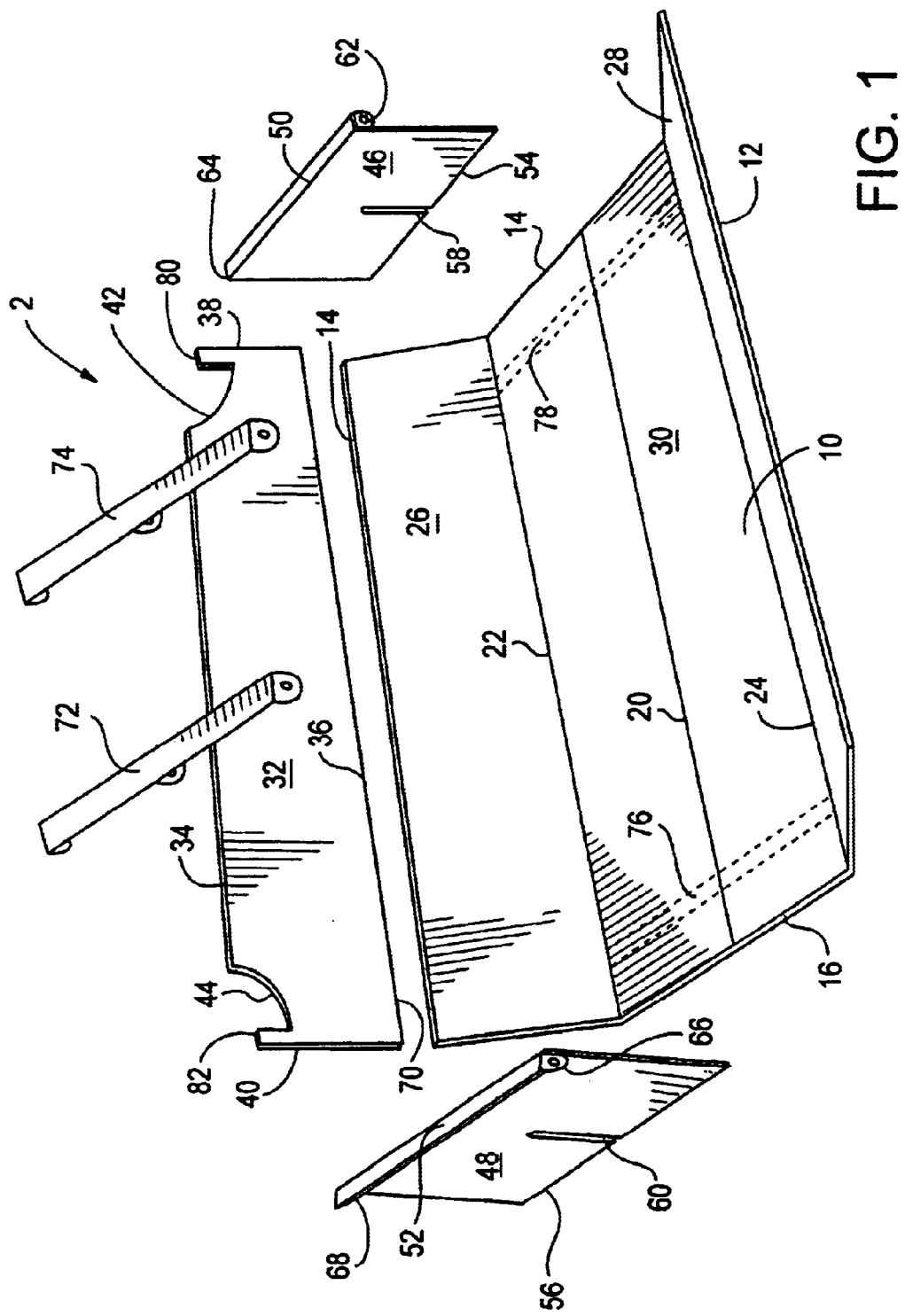
FIG. 1 shows an exploded view of the elements that comprise a preferred embodiment of the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Referring now to the drawings wherein are shown preferred embodiments and wherein like reference numerals designate like elements throughout, there is shown in FIG. 1 an exploded view of a preferred embodiment of the portable, collapsible trunk or cargo space organizer 2 of the present invention in its partly assembled stage. Its elements include what was initially a flat, rectangular main panel 10 having two side edges 12, 14 and two end edges 16, 18. This panel has a centerline 20 between its ends and two fold lines 22, 24 or creases that run parallel to the side edges and serve to define two side sections 26, 28 and a middle section 30 of the panel. These fold lines facilitate the folding of the side sections 26, 28 so that they can be held vertical to the middle section 30.

This organizer further includes a flat, rectangular middle panel 32 which has top and bottom side edges 34, 36 and two end edges 38, 40. Its two, top side corners 42, 44 have a portion with a specified radius of curvature.

Flat, rectangular, end panel 46, 48 each have top 50, 52 and bottom 54, 56 side edges. The width of these panels is approximately equal to width of the middle section 30 of the main panel 10. Each of these end panels has a notch 58, 60 in its bottom side edge 54, 56 that extends perpendicular to its bottom edge. A hinge coupling means 70 attaches the bottom edge 36 of said middle panel to the main panel's centerline 20.

Figure 2:
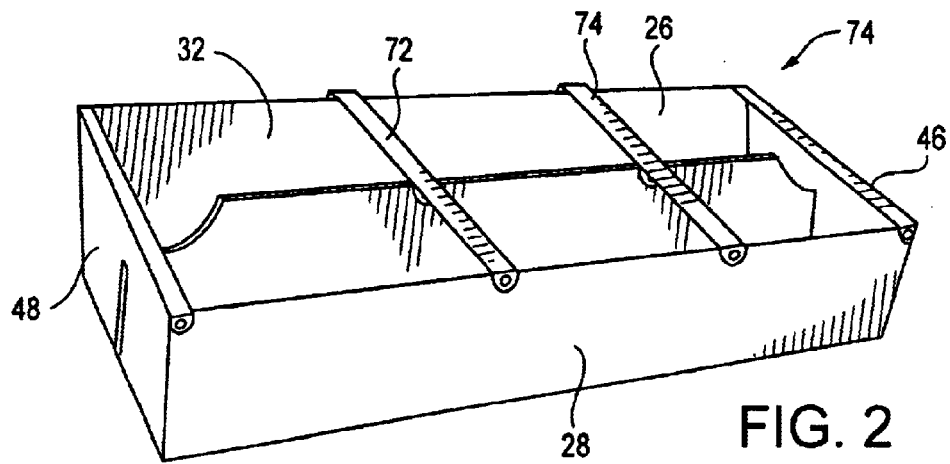
FIG. 2 shows a perspective view of a preferred embodiment of the present invention in its fully assembled and in-use, upright configuration.

Coupling means 62, 64, 66, 68 connect these end panels 46, 48 at their top side corners to the top side corners of the raised side sections 26, 28 of the main panel 10. In its assembled and in-use configuration, these end panels hang vertically downward such that they are perpendicular to both the middle section 30 and side sections 26, 28 of the main panel. They 46, 48 are positioned just inward the ends of the side sections so that they serve as braces to hold these sections 26, 28 and the middle panel 32 in an upright configuration. See FIG. 2.

Figure 3:
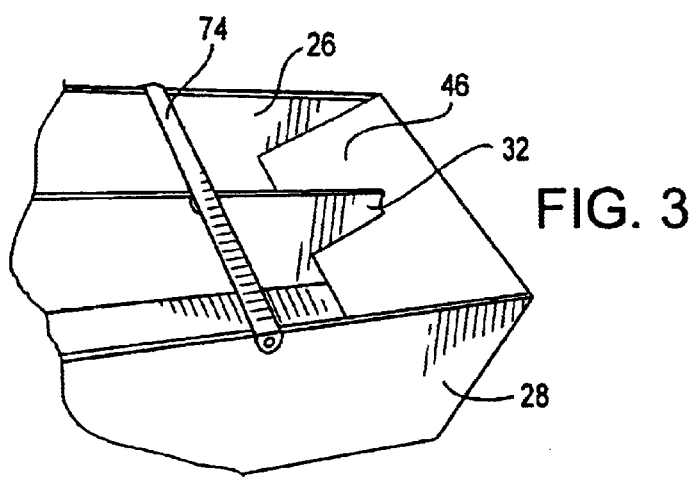
FIG. 3 shows a perspective view of a preferred embodiment of the present invention which illustrates how its end panels rotate upward.

The nature of these couplings is such that these ends 46, 48 can rotate inward about their top edges. This is made possible because of the cooperation between the ends' notches 58, 60 and the curved, corner portions 42, 44 of the middle panel 32. See FIG. 3. For the first ninety degrees of this rotation, the ends' notches 58, 60 slide along the sides of the middle panel while their side edges slide along the inward face of the side sections 26, 28. Beyond ninety degrees, these ends are no longer in contact with the middle panel or the side sections 26, 28 and thus the ends no longer serve as braces to keep these elements upright. The corners of the middle panel's top edge have been shaped so as to form stops 80, 82 that prevent the downward swinging end panels 46, 48 from swinging beyond vertical. This serves to prevent any openings being created around the end panels which could allow items to fall out of the ends of the organizer.

Figure 4:
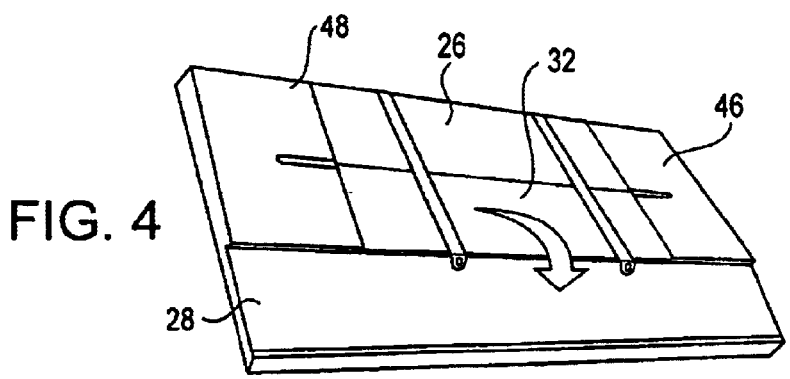
FIG. 4 shows a perspective view of a preferred embodiment of the present invention in its collapsed and stored configuration.

The side sections 26, 28 and middle panel 32 can then rotate about their respective fold lines 22, 24 and the main panel's centerline 20 so as to collapse the organizer. See FIG. 4.

Figure 5:
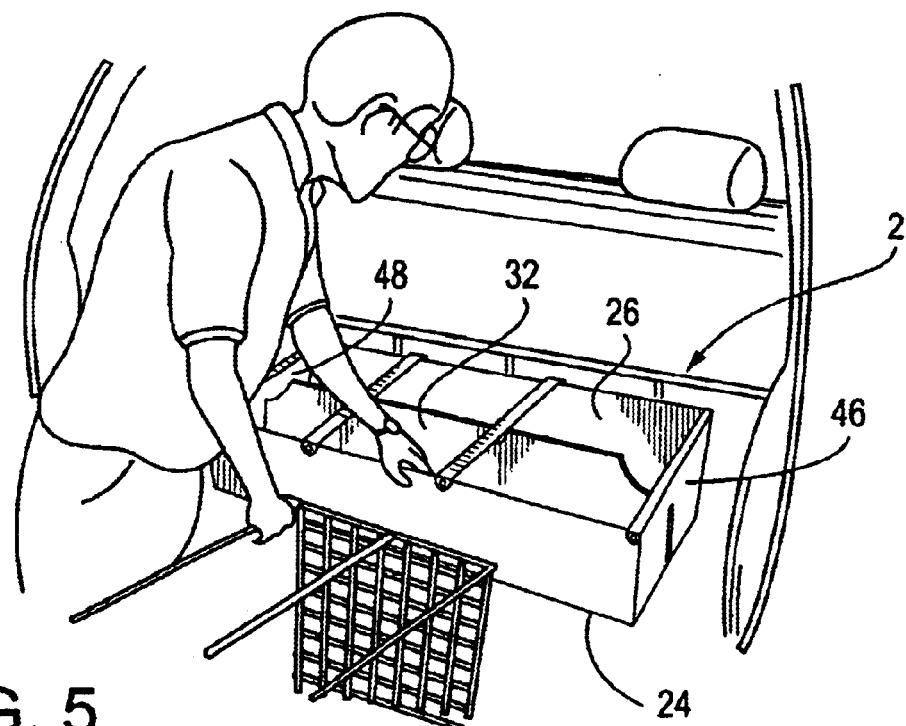
FIG. 5 shows a perspective view of a preferred embodiment of the present invention which illustrates how one can use its straps to aid in pulling this organizer into its upright configuration.
Figure 6:
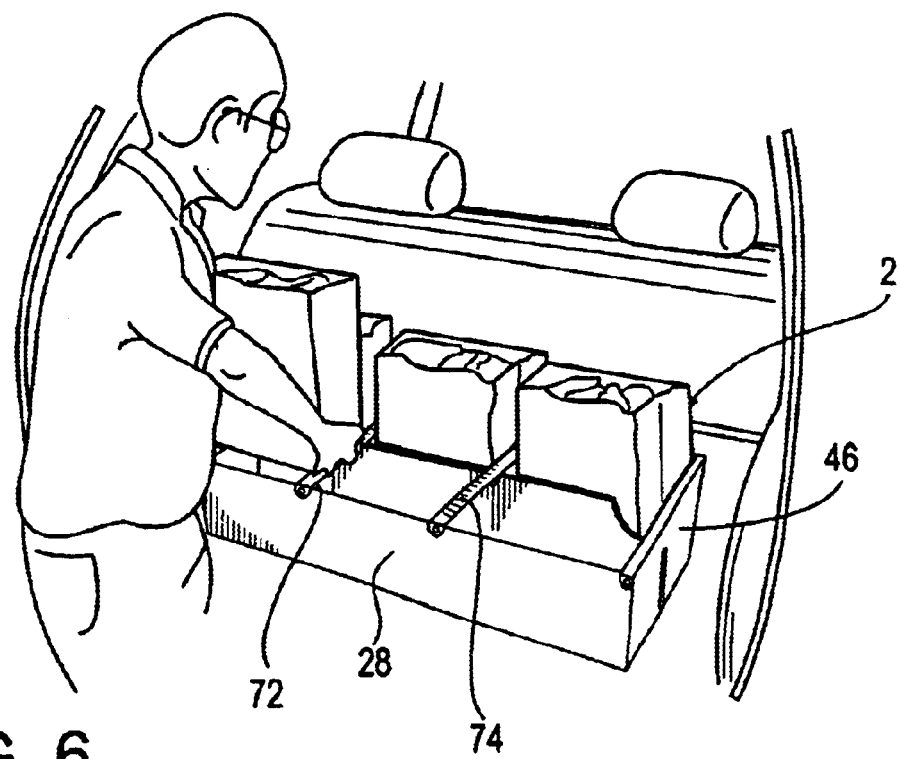
FIG. 6 shows a perspective view of a preferred embodiment of the present invention which illustrates how its straps can serve to aid in compartmentalizing the storage area of the organizer.

One or more straps 72, 74 span across the width of the organizer and are releasably attached on their ends to the top edges of the side sections 26, 28 and in their middle to the top edge 34 of the middle panel. The length of these straps is approximately equal to that of to the width of the middle section 30 of the main panel. These straps serve to aid in moving the side sections 26, 28 and the middle panel 32 in unison. See FIG. 5. They also help to compartmentalize the storage area of the organizer. See FIG. 6.

Hook and loop fasteners 76, 78 may be added to the bottom of the middle section 30 of the main panel 10 to help fasten the organizer 2 to any carpet that is found in the trunk or storage area of a vehicle.

Many materials of construction are suitable for the fabrication of this organizer. A fiberboard product with a woven cloth facing has been found to perform well as the various panels of the organizer.

The foregoing descriptions of the invention have been presented for purposes of illustration and description. Further, the description is not intended to limit the invention to the form disclosed herein. Consequently, variations and modifications commensurate with the above teachings, and combined with the skill or knowledge in the relevant art are within the scope of the present invention.

The preferred embodiments described herein are further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the current art.

I claim:

1. A portable, collapsible organizer comprising:

a main panel having two side edges and two end edges, said panel having a centerline between said ends and having two fold lines in said panel, each said fold line running parallel to said side edges and being located at a specified distance from each of said side edges, said fold lines serving to define two side sections and a middle section of said panel and to facilitate the folding of said side sections so that said side sections can be rotated about said fold lines so as to be held vertical to said middle section, a middle panel, said panel having top and bottom side edges and two end edges, said middle panel having two top side corner edges formed by the intersection of said top side edge and said end edges, a portion of said corner edges having a specified radius of curvature, a first and a second end panel, each of said panels having a top and a bottom side edge and two end edges, the width between said ends being approximately equal to the width of said middle section of said main panel, each of said end panels having a notch in said bottom side edge, said notch extending perpendicular to said bottom side edge, a strap having two ends, the length of said strap being approximately equal to the width of said main panel middle section, each end of said strap attaching to one of said side edges of said main panel, a first means for coupling each of the top side corners of said first end panel to one of the opposite corners at one end of said main panel, a second means for coupling each of the top side corners of said second end panel to one of the opposite corners at the other end of said main panel, and a means for hingedly coupling said bottom edge of said middle panel to said centerline of said main panel.

2. An organizer as recited in claim 1 further comprising a means for fastening attached to the bottom of said main panel middle section that allows said organizer to be secured to a portion of the environment surrounding said organizer.

3. An organizer as recited in claim 1 wherein said first and second means of coupling configured so as to allow said first and second end panels to rotate inward and upward about their top side edges when said main panel side sections and middle panel are being held perpendicular to said main panel middle section.

4. An organizer as recited in claim 3 further comprising a means for fastening attached to the bottom of said main panel middle section that allows said organizer to be secured to a portion of the environment surrounding said organizer.

5. An organizer as recited in claim 3 further comprising a means for stopping the downward rotation of said end panels so that said panels do outside the boundaries formed by said main panel side sections when said sections are being held in a vertical orientation.

6. An organizer as recited in claim 5 further comprising a means for fastening attached to the bottom of said main panel middle section that allows said organizer to be secured to a portion of the environment surrounding said organizer.

7. An organizer as recited in claim 1 wherein said curved portions of said middle panel corner edges and said end panel notches configured so as to allow said end panels to rotate upward with the edges of said notches sliding along a portion of the faces of said middle panel when said middle panel is being held in a vertical position.

8. An organizer as recited in claim 7 further comprising a means for fastening attached to the bottom of said main panel middle section that allows said organizer to be secured to a portion of the environment surrounding said organizer.

9. An organizer as recited in claim 7 further comprising a means for stopping the downward rotation of said end panels so that said panels do outside the boundaries formed by said main panel side sections when said sections are being held in a vertical orientation.

10. An organizer as recited in claim 9 further comprising a means for fastening attached to the bottom of said main panel middle section that allows said organizer to be secured to a portion of the environment surrounding said organizer.

11. An organizer as recited in claim 7 wherein said first and second means of coupling configured so as to allow said first and second end panels to rotate inward and upward about their top side edges when said main panel side sections and middle panel are being held perpendicular to said main panel middle section.

12. An organizer as recited in claim 11 further comprising a means for fastening attached to the bottom of said main panel middle section that allows said organizer to be secured to a portion of the environment surrounding said organizer.

13. An organizer as recited in claim 11 further comprising a means for stopping the downward rotation of said end panels so that said panels do outside the boundaries formed by said main panel side sections when said sections are being held in a vertical orientation.

14. An organizer as recited in claim 13 further comprising a means for fastening attached to the bottom of said main panel middle section that allows said organizer to be secured to a portion of the environment surrounding said organizer.

* * * * *